Feb. 11, 1936.   R. D. ROSS   2,030,801
REMOTE CONTROL FOR THEATER LIGHTS
Filed May 7, 1930    2 Sheets-Sheet 1

INVENTOR
Robert D. Ross
BY
Wesley G. Carr
ATTORNEY

Feb. 11, 1936. R. D. ROSS 2,030,801
REMOTE CONTROL FOR THEATER LIGHTS
Filed May 7, 1930 2 Sheets-Sheet 2

INVENTOR
Robert D. Ross
BY
Wesley G. Carr
ATTORNEY

Patented Feb. 11, 1936

2,030,801

UNITED STATES PATENT OFFICE 2,030,801

REMOTE CONTROL FOR THEATER LIGHTS

Robert D. Ross, Wilkinsburg, Pa., assignor to Westinghouse Electric & Manufacturing Company, a corporation of Pennsylvania Application May 7, 1930, Serial No. 450,586

9 Claims. (Cl. 171—119)

My invention relates to current controlling apparatus and particularly to apparatus for controlling theater lighting circuits.

An object of my invention is to provide a current controlling apparatus wherein the current supplied to a plurality of circuits may be controlled from a remote point and wherein the control apparatus may be preset to cause any desired intensity of illumination in any lighting circuit and for any desired number of scenes or settings.

A further object of my invention is to provide a theater lighting control apparatus wherein the current controlling devices may be of compact construction and occupy a minimum of space on a switchboard, and wherein the amount of current required for controlling the lighting circuits is also reduced to a practically negligible quantity.

A further object of my invention is to provide a theater lighting control apparatus wherein the voltage of the lighting circuits is controlled through the medium of reactors, and wherein the reactors are controlled by varying the potential bias on the grids of vacuum tubes or three-electrode valves through the medium of presetable rheostats or potentiometers.

Multi-scene presetable switchboards have been controlled heretofore by rheostats and potentiometers which control the control winding of a reactor, but switchboards of this character are not practical where it is desired to preset the light intensity for a plurality of scenes or settings, because of the current losses incident to rheostats and potentiometers capable of controlling sufficient current to properly energize the control winding of the reactor, and because of the prohibitive space necessary to mount the relatively large resistance units, one of which is required in each lamp circuit for each scene that is to be preset, and in a ten scene switchboard, such as are commonly used, ten presetable resistance units are required for each lamp circuit.

It is an object of my invention to provide a multi-scene preset switchboard wherein the rheostats or potentiometers simply control the grid bias of three-electrode valves, and consequently pass a negligible quantity of current, and may be no larger than the usual radio receiver potentiometer and may be mounted upon a control desk accessible to an operator while seated. This desk may be located at any desired remote point.

A further object of my invention is to provide a switchboard having the above noted characteristics wherein the grid potential of a three-electrode valve is controlled by a small potentiometer and wherein the output of the said valve controls the output of a grid-glow three-electrode valve which supplies current to the control winding of the reactor, and wherein the grid-glow tube is regulated to operate in its most advantageous voltage range.

These and other objects that will be made apparent throughout the further description of my invention are attained by means of the apparatus hereinafter described and illustrated in the accompanying drawings wherein;

Fig. 3 is a view showing curves which illustrate the operation of a portion of the apparatus in Fig. 1.

Figure 1:
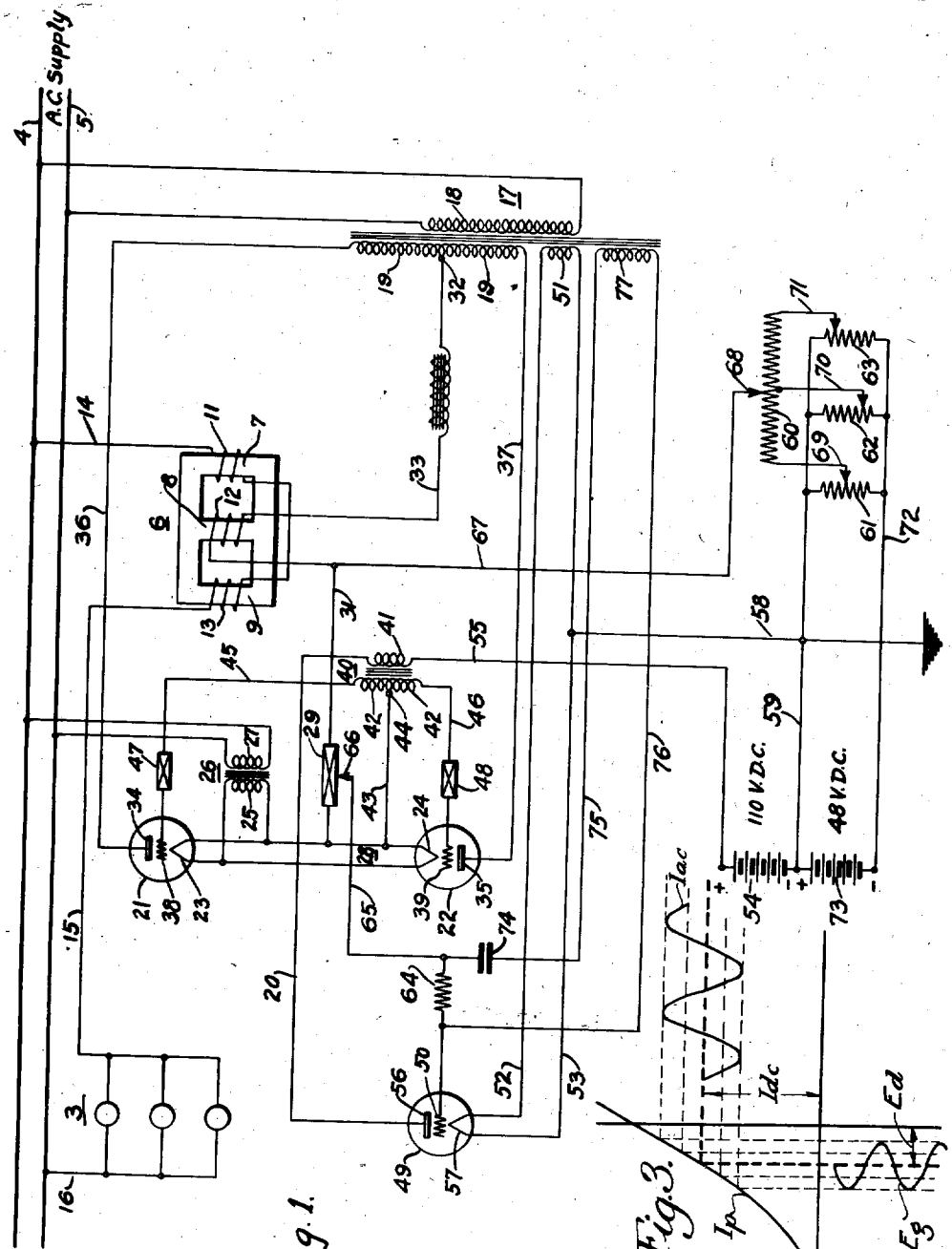
Figure 1 is a wiring diagram disclosing the apparatus for controlling a single lighting circuit and the presetable mechanism for determining the current conditions for a plurality of scenes or settings.

Referring to the drawings, and particularly to Fig. 1, the lighting circuit 3 is supplied with current from the alternating current feed conductors 4 and 5 and the voltage of the current is controlled by a reactor 6 having three cores 7, 8 and 9 having windings 11, 12 and 13 wound thereabout respectively.

The windings 11 and 13 are series connected and are connected in the lamp circuit 3 by means of conductors 14 and 15, the former being connected to the feed conductor 4. The other side of the lamp circuit is connected to the feed conductor 5 by a conductor 16.

The winding 12 is the control winding of the reactor and is supplied with unidirectional current which varies the magnetic flux of the core of the reactor in response to variations in the current through the control winding, thereby effecting the voltage of the windings 11 and 13 in the well known manner of reactors of this character.

My invention particularly concerns the method and apparatus for controlling the current through the control winding 12, whereby a predetermined voltage may be impressed on the lamp circuit during any number of scenes or settings.

Rectified current is supplied to the control winding 12 from a transformer 17 having a primary winding 18 and a secondary winding 19, through the medium of two hot-cathode grid-glow tubes 21 and 22 that are connected in "push-pull" relation.

The filaments 23 and 24 of the tubes 21 and 22, respectively, are energized by the secondary winding 25 of a transformer 26, the primary winding 27 of which is connected across the feed conductors 4 and 5, and one side of the filament or cathode circuit 28 is connected through a rheostat resistor 29 and conductor 31 to one end of the control winding 12 which is connected at its other end to the center tap 32 of the secondary winding 19 through the conductor 33.

The plates 34 and 35 of the tubes 21 and 22 are connected to opposite ends of the secondary winding 19 by conductors 36 and 37, respectively, and the current supplied through the plate circuit of the tubes, to the control winding is dependent upon the potential bias on the grids 38 and 39 of the tubes 21 and 22, respectively.

The flow of unidirectional current through the control windings 12, is controlled by the tubes 21 and 22, and during a half cycle of the alternating current, is as follows: from the secondary winding 19 through conductor 36, plate 34 of the tube 21, cathode 23, cathode circuit 28, rheostat resistance 29, conductor 31, control winding 12, conductor 33 to the central point 32 of the secondary winding 19. During this half cycle of alternating current supplied by the transformer 17, the tube 22 is inoperative, however, during the succeeding half-cycle the tube 21 is inoperative and the current through the control winding 12 flows through the tube 22 from the secondary winding 19, through conductor 37, plate 35, cathode 24, cathode circuit 28, rheostat resistor 29, conductor 31, winding 12, conductor 33 to the central point 32 of the secondary winding 19.

The average amount of current passed by the grid-glow tubes 21 and 22 depends on the point of the alternating current cycle at which they break down and conduct current, thus, a tube so controlled that it breaks down late in the cycle, will not pass as much average current as when the control is such that it breaks down early in the cycle. The break down point, and consequently the output current of the tubes, is controlled by the amount of voltage supplied to the grids of the tubes 21 and 22.

The alternating voltage impressed upon the grids of the grid-glow tubes is supplied from a transformer 40 having a primary winding 41 and a secondary winding 42, the primary winding being energized in a manner to be hereinafter described. The circuit including the grids, comprises the cathodes 23 and 24, cathode circuit 28, conductor 43, central point 44 of the secondary winding 42, conductors 45 and 46, resistors 47 and 48, respectively and the grids 38 and 39 respectively. Each of the resistors 47 and 48 have a resistance preferably of 1 megohm, and are for the purpose of limiting any grid current that may flow, to a very small value. It is thus apparent that the grid voltage of the tubes 21 and 22 is dependent upon the current in the circuit including the primary winding 41 of the transformer 40.

The current passing through the primary winding 41 is supplied from the plate circuit of a hot cathode tube 49, this current is the equivalent of a direct or unidirectional current upon which an alternating current is superimposed, as will be herein described. The tube is provided with the usual grid 50 and a cathode 57 that is connected to a secondary winding 51 of the transformer 17 by conductors 52 and 53.

The source of direct current comprises a B-battery 54 or other source of direct current, preferably having a potential difference of about 110 volts, to which one end of the primary winding 41 is connected by a conductor 55, the other end of the primary winding being connected to the plate 56.

The direct current circuit is from the positive terminal of the battery 54, conductor 55, primary winding 41, conductor 20, plate 56, cathode 57, conductors 53, 58 and 59, to the negative terminal of battery 54.

The superimposed alternating current exists by virtue of conditions in the grid circuit of tube 49 which is controlled by the potentiometer 60 and the presetable potentiometers 61, 62 and 63, one of the latter being provided for each scene or setting desired. As shown, potentiometers for three scenes or settings are provided, but any desired number of potentiometers may be employed, as the case demands.

The circuit for the grid 50 is through the resistor 64, conductor 65, to rheostat arm 66, rheostat resistor 29, conductors 31 and 67, potentiometer arm 68, potentiometer resistor 60, any one of the potentiometer arms 69, 70 and 71, and potentiometers 61, 62 and 63 that are connected across the conductors 59 and 72, through conductors 59, 58 and 53 to the cathode 57. The conductors 72 and 59 are connected respectively to the negative and positive terminals of the C-battery 73, preferably having a potential drop of about 48 volts.

The resistor 64 is connected through a condenser 74, and conductors 75 and 76 to another secondary winding 77 of the transformer 17. The alternating potential drop across the resistor 64 is impressed on the grid of tube 49 and thus causes the alternating component of the plate current of this tube to appear. The purpose of the condenser 74 is to shift the phase of the alternating electro-motive force with respect to the electro-motive force of the secondary winding 19 of transformer 17 across the resistor 64, as it has been found that this phase shift causes break down of the tubes 21 and 22 to occur over that portion of the cycle which gives best control.

I have also included in the circuit of grid 50, the rheostat 29, through which also flows the current from the grid-glow tubes 21 and 22 to the reactor winding 12, thereby causing a voltage drop to exist across resistor 29 that is coupled into the grid circuit of tube 49. The resistor is therefore common to both the grid circuit of tube 49 and the circuit through the control winding 12.

All of the said potential drop, or any portion thereof, can be coupled into the aforementioned grid circuit by varying the position of the rheostat arm 66 that is connected to the conductor 65. The purpose of this voltage drop will hereinafter appear.

A still further voltage drop is coupled into the grid circuit through the potentiometer rheostats, 61, 62 and 63. In the position of the potentiometer arms 68, 69, 70 and 71 shown, the voltage drop is determined by the position of the potentiometer arm 70, and is not appreciably affected by the position of the arms 69 and 71, since the resistance of the potentiometer resistor 60 is relatively high compared with that of the resistors 61, 62 and 63. The potential bias on the grid 50 of the tube 49 is then governed by the position of the resistor 62 and its adjustable arm 70. The amount of this bias governs the magnitude of the alternating current voltage that is coupled into the plate circuit of tube 49, and hence governs the output of the grid-glow tubes 21 and 22 which control the current through the control winding 12 of the reactor 6.

The voltage drop referred to above across the resistor 29 also governs the bias on the grid 50 of the tube 49 and, if for any reason, the current output of the grid-glow tubes 21 and 22 increases, the drop across resistor 29 increases and so affects the voltage bias on the grid 50 of tube 49 that this tube acts to decrease the current and bring it back to normal. Thus the resistor 29 serves as an automatic current regulator. The arm 66 of the resistor 29 is adjustable and may be positioned at the point where best results are obtained. Thus compensation may be obtained for any variations in tube characteristics.

As shown in Fig. 3, in which $I_p$ is a characteristic curve for the tube 49, the alternating potential drop across the resistor 64 is superimposed on the negative biasing potential $E_d$, which is composed of the drop across the rheostat 29 and voltage drop across the potentiometer rheostats 61, 62 and 63. Therefore, the resultant grid potential $-E_g$ produces a current in the plate circuit of the tube 49 having an alternating component $I_{ac}$ and a direct current component $I_{dc}$. The plate current passes through the primary winding of the transformer 40 and the alternating current component appears in the secondary winding of the transformer.

Since the grid biasing potential controls the amplification of the tube 49 by varying the operating point on the curve $I_p$, the magnitude of the alternating current component may be varied by varying the biasing potential, as by means of the potentiometer rheostats 61, 62 and 63. In this manner the grid excitation voltage supplied to the rectifying tubes 21 and 22 may be controlled, which in turn controls the output of these tubes, as explained hereinbefore.

As previously stated, the adjustable arms or sliders 69, 70 and 71 of the potentiometers 61, 62 and 63 may be pre-set to produce any desired effect upon the reactor 6 and consequently, any desired degree of illumination intensity of the lamps in the lighting circuit, and when the scene control arm or slider 68 is placed opposite a certain potentiometer lead, for example, the potentiometer 62, the position of the arms or sliders 69 and 71 will have no effect upon the potential of the grid circuit.

The resistor 60 is provided between each potentiometer arm to effect a gradual voltage change when the slider 68 is moved from one scene position to another.

Figure 2:
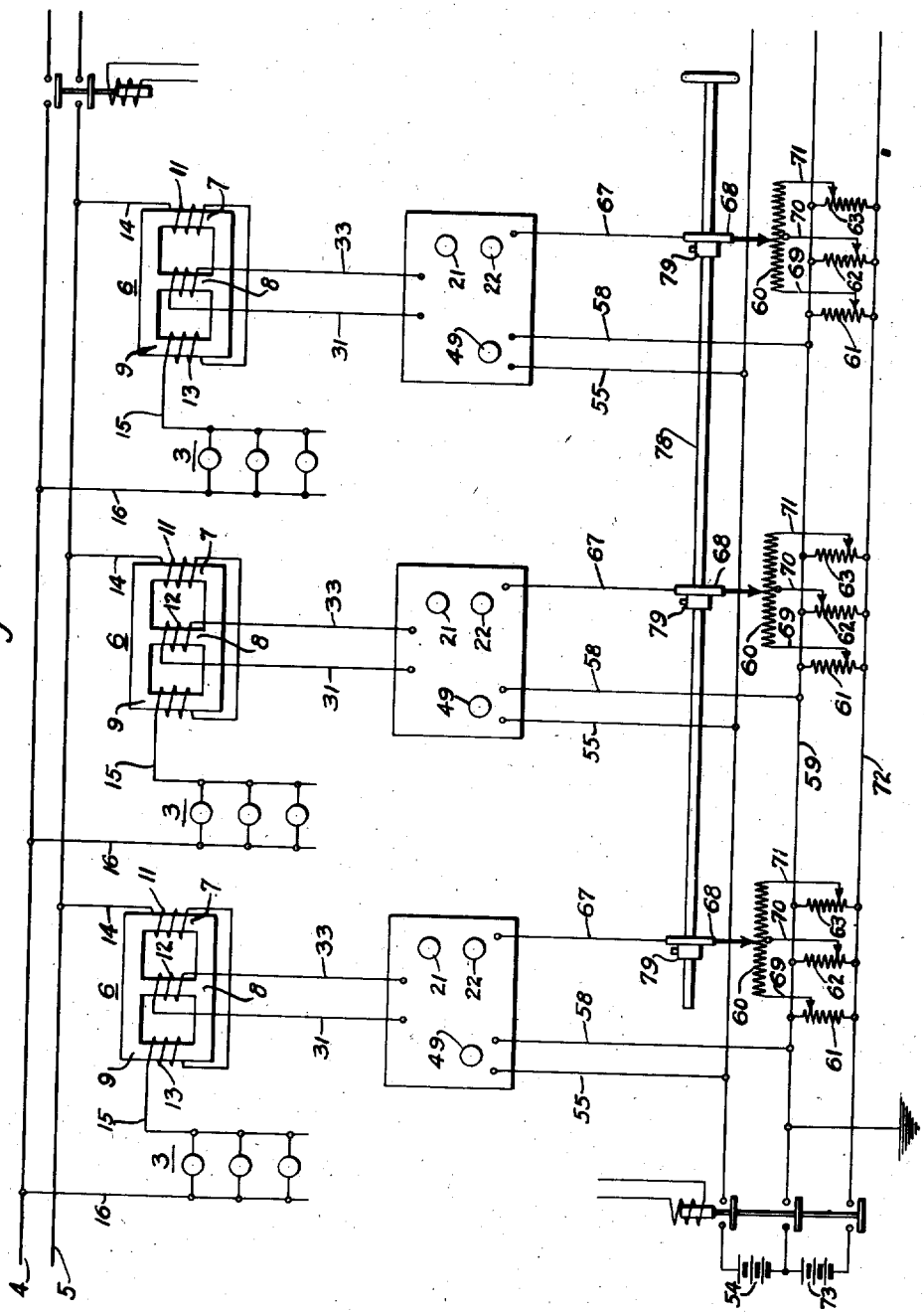
Fig. 2 is a wiring diagram disclosing the arrangement of the control apparatus shown in Fig. 1 for controlling a plurality of circuits.

Fig. 2 is a wiring diagram illustrating the manner in which a plurality of lamp circuits are connected to pre-settable control units, the slider 68 being releasably connected to an operating rod 78 or shaft for simultaneous movement, or for selective operation, each slider being releasably connected to the rod by means of a clutch 79 that may be so adjusted that the slider will move or remain stationary when the rod 78 is actuated.

While I have disclosed a circuit controlling device using two stages of hot cathode tubes connected in a specific manner particularly suited for the type of tubes employed and having certain characteristics peculiar to the tubes, it will be understood that, tubes having other characteristics may be employed, and other manner of connections suitable for such tubes may be devised, and that presettable rheostats may be employed for controlling the grid bias in place of the potentiometers, without departing from the spirit of my invention.

I claim as my invention:

1. Means for controlling current in an electrical circuit including, a reactor having a control winding, a source of alternating current, a source of direct current, a three-electrode valve having its hot cathode energized from the alternating current source, a three-electrode grid-glow valve having its input circuit energized from the alternating current source and having its output circuit connected to energize the control winding of the reactor, a transformer having a secondary winding for energizing the grid of the second valve and having its primary winding connected in the output circuit of the first valve and to the direct current source, means for displacing the phase relation of the potential impressed on the second valve, an adjustable means for regulating the break down potential of the grid-glow valve, and means for impressing variable potential values upon the grid of the first valve for controlling the current output of the grid-glow valve and the said reactor.

2. Means for controlling current in an electrical circuit including a reactor having a control winding, a pair of three-electrode valves connected in push-pull relation for controlling the energization of said control winding, means for impressing an alternating-current potential on the plates of said valves, means for impressing a potential on the grids of said valves, means for displacing the phase relation of the potential impressed on the plates and that impressed on the grids of said valves, a control tube for controlling the energization of the grids of said valves, means for impressing variable potential values upon the grid of the control tube, whereby the current output of the three-electrode valves is controlled, and means responsive to the current output of said valves for compensating for changes in the characteristics of said valves.

3. Means for controlling current in an electrical circuit including a reactor having a control winding, a pair of grid-glow rectifier tubes connected in push-pull relation for controlling the energization of said control winding, means for impressing an alternating-current potential on the plates of said tubes, a transformer for impressing a potential on the grids of said tubes, means for displacing the phase relation of the potential impressed on the plates and that impressed on the grids of said tubes, a control tube for controlling the energization of said transformer, presettable means for impressing selected potential values upon the grid of the control tube, whereby the current output of the rectifier tubes is controlled, and means for compensating for changes in the characteristics of the tubes.

4. Means for controlling the current supplied to a current responsive device, comprising a pair of electric discharge devices connected in push-pull relation for controlling the energization of said current responsive device, means for impressing an alternating-current potential on the plates of said discharge devices, a transformer for impressing a potential on the grids of said discharge devices, means for displacing the phase relation of the potential impressed on the plates and that impressed on the grids of said discharge devices, a vacuum tube for controlling the energization of said transformer, means for impressing variable potential values upon the grid of the vacuum tube, whereby the current output of the electric discharge devices is controlled, and means for maintaining the current output of said discharge devices at preselected values.

5. Means for controlling the current supplied to a current responsive device, comprising a pair of electric discharge devices connected in push-pull relation for controlling the energization of said current responsive device, means for impressing an alternating-current potential on the plates of said discharge devices, a transformer for impressing a potential on the grids of said discharge devices, means for displacing the phase relation of the potential impressed on the plates and that impressed on the grids of said discharge devices, a vacuum tube for controlling the energization of said transformer, means for impressing variable potential values upon the grid of the vacuum tube, whereby the current output of the electric discharge devices is controlled, and means for compensating for changes in operating characteristics of said discharge devices to maintain the current output of said discharge devices at preselected values.

6. Means for controlling the current supplied to a current responsive device, comprising a pair of electric discharge devices connected in push-pull relation for controlling the energization of said current responsive device, means for impressing an alternating-current potential on the plates of said discharge devices, a transformer for impressing a potential on the grids of said discharge devices, means for displacing the phase relation of the potential impressed on the plates and that impressed on the grids of said plates discharge devices, a three element control tube for controlling the energization of said transformer, means for impressing preselectable potential values upon the grid of the control tube whereby the current output of the electric discharge devices is controlled and means responsive to the current output of said discharge devices for varying the potential impressed upon the grid of the control tube to compensate for changes in the operating characteristics of the discharge devices.

7. Means for controlling the current supplied to a current responsive device, comprising a pair of electric discharge devices connected in push-pull relation for controlling the energization of said current responsive devices, means for impressing a potential on the plates of said discharge devices, means for impressing a potential on the grids of said discharge devices, a three element control tube for controlling the energization of said last-named means, means for impressing preselectable potential values upon the grid of the control tube whereby the current output of the electric discharge devices is controlled, and means responsive to the current output of said discharge devices for varying the potential impressed upon the grid of the control tube to regulate the output of said discharge devices.

8. Means for controlling the current supplied to a current responsive device, comprising an electric discharge device for controlling the energization of said current responsive device, means for impressing a potential on the anode of said discharge device, means for impressing a potential on the grid of said discharge device, a control device for controlling the energization of said last-named means, means for impressing preselectable potential values upon said control device whereby the current output of the electric discharge device is controlled, and means responsive to the current output of said discharge device for varying the potential impressed upon the control device to regulate the output of said discharge device.

9. Means for regulating the output of an electric discharge device comprising means for impressing a potential on the anode of said discharge device, means for impressing a potential on the grid of said device, a control device for controlling the energization of said last-named means, means for impressing preselectable potential values upon said control device whereby the current output of the electric discharge device is controlled, and means responsive to the current output of said discharge device for varying the potential impressed upon the control device to regulate the output of said discharge device.

ROBERT D. ROSS.